Patented Feb. 28, 1933

1,899,579

UNITED STATES PATENT OFFICE

ARTHUR LÜTTRINGHAUS, OF MANNHEIM, HEINRICH NERESHEIMER, OF LUDWIGS-HAFEN-ON-THE-RHINE, AND HANS EMMER, OF MANNHEIM, GERMANY, ASSIGNORS TO GENERAL ANILINE WORKS, INC., OF NEW YORK, N. Y., A CORPORATION OF DELAWARE

PROCESS FOR MAKING DIBENZANTHRONE FROM THE CORRESPONDING BZ1.BZ1'-DIBENZANTHRONYLS

No Drawing. Application filed December 9, 1926, Serial No. 153,725, and in Germany December 14, 1925.

We have now found that Bz1.Bz1'-dibenzanthronyls of which the unsubstituted Bz1.Bz1' dibenzanthronyl corresponds to the formula

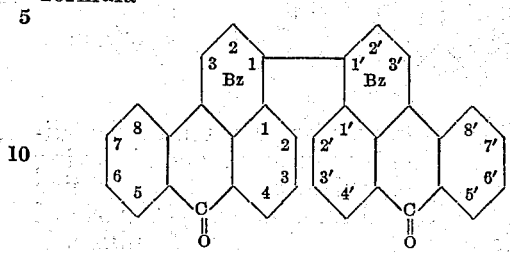

can be very readily converted into vat dyestuffs of the benzanthrone series with a good, and in some cases almost a quantitative yield, by treatment with alkaline condensing agents. The formation of the dyestuff proceeds without difficulty and at comparatively low temperatures. In some cases it is advisable to add a reducing agent, for instance formaldehyde-sulfoxylate to the alkaline condensing agent. Then the formation of the dyestuff sometimes takes place in aqueous suspension and at temperatures slightly exceeding 100° C.

The Bz1.Bz1'-dibenzanthronyls employed as initial materials according to the present invention can be prepared for example by treating Bz1-halogenbenzanthrones with metal powders, or by boiling Bz1-diazobenzanthrones in the presence of cuprous chloride, or by the oxidation of benzanthrones in acid solution according to the process of the German Patent 431,774.

According to the present invention derivatives of dibenzanthrone may also be prepared, which are not obtainable, or only in an impure state, by the usual and previously known methods. Thus, for example by fusing halogen-Bz1.Bz1'-dibenzanthronyls with alcoholic caustic potash, under the particularly mild conditions employed according to this invention, the corresponding halogen-dibenzanthrones are readily obtained. If, on the other hand, it is attempted to produce the same dyestuffs by applying the previously known and usual alkaline condensation methods to halogen-containing benzanthrones or 2.2'-dibenzanthronyls, dyestuffs of different shades, and mostly with a substantially inferior yield, are obtained.

The following examples will further illustrate how the said invention may be carried out in practice but the invention is not limited to these examples. The parts are by weight.

Example 1

10 parts of Bz1.Bz1'-dibenzanthronyl are introduced in about half an hour into a melt of 100 parts of caustic potash and 90 parts of ethyl alcohol heated to from 120° to 130° centigrade. The formation of dibenzanthrone of the formula

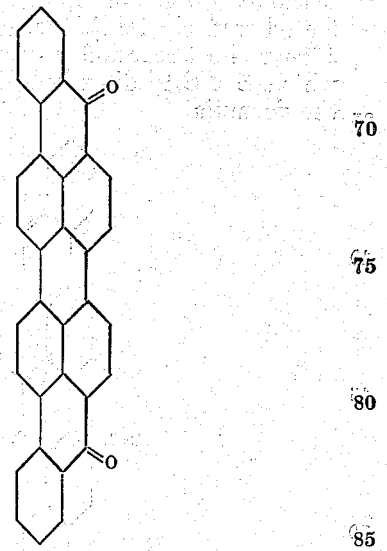

sets in almost immediately, accompanied by a little effervescing. Stirring is continued for a further 2 hours at a temperature of from 120° to 130° centigrade, whereupon the reaction mixture is placed in water, air is blown through and the dyestuff is worked up in the usual manner. In this way an approximately quantitative yield of very pure dibenzanthrone is obtained.

Example 2

A suspension of 10 parts of finely divided Bz1.Bz1'-dibenzanthronyl in 200 parts of caustic soda solution (40° Baumé strength) and 3000 parts of water is heated to boiling, under a reflux condenser, for about 12 hours, in the course of which period it is treated with an addition of 60 parts of sodium formaldehydesulfoxylate. The violet-red vat of the dyestuff is filtered, after addition of caustic soda solution and sodium hydrosulfite, if required, and the dyestuff is precipitated, preferably by oxidizing agents such as sodium hypochlorite solution.

Example 3

If the Bz1.Bz1'-dibenzanthronyl in Example 1 be replaced by Bz2.Bz2'-dimethyl-Bz1.Bz1'-dibenzanthronyl corresponding to the formula

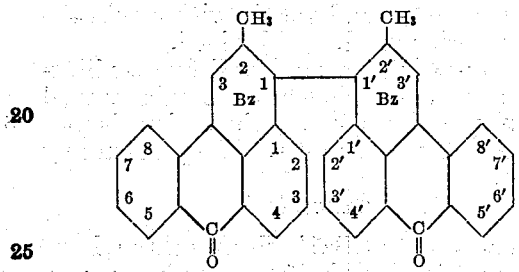

(obtainable in accordance with the German Patent 431,774 by the oxidation of Bz2-methylbenzanthrone, and forming a brown powder, furnishing a bluish-red solution, without appreciable fluorescence, in concentrated sulfuric acid), there will be obtained, after a short reaction, a deep blue melt from which Bz2.Bz2'-dimethyl-dibenzanthrone of the formula

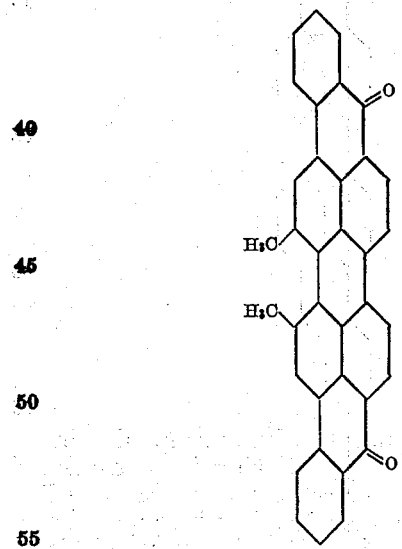

can be recovered by treatment in the usual manner. The crude dyestuff can be purified by re-solution from organic solvents. It forms a dark blue powder, with a bronze sheen, and is soluble with comparative ease in organic liquids of low boiling point, such as acetone, or benzene, and far more readily in media of high boiling point such as trichlorbenzene or nitrobenzene, the solution being of a brilliant red-violet color and exhibiting an intense red fluorescence. The solution in concentrated sulfuric acid is also red-violet in color. From a blue vat, the dyestuff gives blue-violet dyeings on cotton, and these differ from those produced by dibenzanthrone by greater brightness and the valuable property of not displaying any appreciable tendency to increased redness of tinge when moistened with water.

Example 4

A solution or suspension of 10 parts of 6.6'-dichlor-Bz1.Bz1'-dibenzanthronyl corresponding to the formula

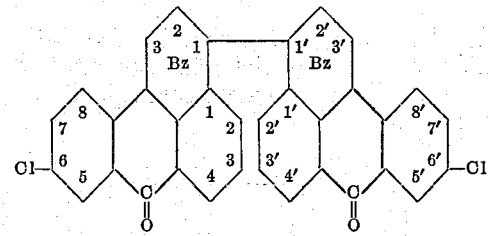

(an olive-green powder prepared by the oxidation of 6-chlorbenzanthrone, and dissolving in concentrated sulfuric acid to a carmine solution with red fluorescence), 50 parts of caustic potash, and 125 parts of aniline, is heated to a temperature of 130° to 135° C. for about an hour. The crude dyestuff obtained after the removal of the aniline may be purified, for example, by extraction with acetone. The dyestuff of the formula

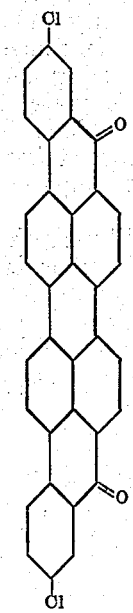

forms a blackish powder, which is soluble with difficulty in organic solvents but readily so (to a red-violet solution) in concentrated sulfuric acid. It dyes cotton, from a red-violet vat, shades which are of substantially greener tinge than those produced by dibenzanthrone.

The same dyestuff is obtained by treating 6.6'-dichlor-Bz1.Bz1'-dibenzanthronyl with alcoholic caustic potash as in Example 1. On the other hand, the dyestuff obtainable in the known manner from 6-chlorbenzanthrone under the same conditions gives weaker and redder dyeings.

We claim:

1. The process of producing vat dyestuffs of the dibenzanthrone series which comprises treating a Bz1.Bz1'-dibenzanthronyl with an alkaline condensing agent at a temperature above 100° C. and up to about 135° C.

2. The process of producing dibenzanthrone which comprises treating Bz1.Bz1'-dibenzanthronyl with an alkaline condensing agent at a temperature above 100° C. and up to about 135° C.

In testimony whereof we have hereunto set our hands.

ARTHUR LÜTTRINGHAUS.
HEINRICH NERESHEIMER.
HANS EMMER.